United States Patent

Ohashi et al.

[11] Patent Number: 5,481,595
[45] Date of Patent: Jan. 2, 1996

[54] VOICE TAG IN A TELEPHONE AUTO-DIALER

[75] Inventors: Susumu Ohashi, Coppell, Tex.; Hideo Tateishi; Toshiaki Fujikura, both of Chiba, Japan

[73] Assignees: Uniden America Corp., Fort Worth, Tex.; Uniden Corporation, Ichikawa, Japan

[21] Appl. No.: 208,631

[22] Filed: Mar. 8, 1994

[51] Int. Cl.⁶ .............................. H04M 1/56; H04M 1/27
[52] U.S. Cl. .............................. 379/67; 379/58; 379/355; 379/356; 379/354
[58] Field of Search .................................. 379/354, 355, 379/356, 357, 216, 59, 67, 88, 58

[56] References Cited

U.S. PATENT DOCUMENTS

| | | | |
|---|---|---|---|
| 3,993,877 | 11/1976 | Sendyk et al. | 379/355 |
| 4,675,902 | 6/1987 | Boeckmann | 379/387 X |
| 4,731,811 | 3/1988 | Dubus | 379/58 |
| 4,737,976 | 4/1988 | Borth et al. | 379/58 |
| 4,870,686 | 9/1989 | Gerson et al. | 381/43 |
| 4,961,212 | 10/1990 | Marui et al. | 379/67 |
| 5,007,081 | 4/1991 | Schmuckal et al. | 379/54 |
| 5,042,063 | 8/1991 | Sakanishi et al. | 379/88 |
| 5,095,503 | 3/1992 | Kowalski | 379/354 X |
| 5,111,501 | 5/1992 | Shimanuki | 379/354 X |
| 5,191,606 | 3/1993 | Juang | 379/387 X |
| 5,204,894 | 4/1993 | Darden | 379/216 |
| 5,222,121 | 6/1993 | Shimada | 379/354 X |
| 5,301,227 | 4/1994 | Kamei et al. | 379/355 X |
| 5,303,288 | 4/1994 | Duffy et al. | 379/59 |
| 5,371,779 | 12/1994 | Kobayashi | 379/355 |
| 5,430,791 | 7/1995 | Feit et al. | 379/67 |

*Primary Examiner*—Jeffery Hofsass
*Assistant Examiner*—Daniel S. Hunter
*Attorney, Agent, or Firm*—Daniel R. Brown

[57] ABSTRACT

A portable telephone is disclosed which comprises a data memory having a plurality of data storage locations for storing telephone numbers used to initiate telephone calls as an auto-dialer function. An audio memory is also disclosed which comprises a plurality of audio storage location, each of which may be linked to one of the data storage locations. A controller with a key matrix for inputting commands and a display for displaying status is included such that commands can be entered that cause the controller to sequentially recall telephone numbers stored in the data memory and play back voice tags stored in the audio memory, that are linked with the data memory. A loud speaker is disclosed for playing back the audio tags at a loud volume. When a tag is heard that represents the desired call destination, that call is initiated. A recording function is provided that allows utterance spoken into a microphone in the portable telephone to be recorded into the various audio storage locations in the portable telephone.

7 Claims, 13 Drawing Sheets

VOICE TAG IN A TELEPHONE AUTO-DIALER

TECHNICAL FIELD OF THE INVENTION

This invention pertains to telephones and more particularly to portable telephone auto-dialer number memories having voice tag identifiers linked thereto.

BACKGROUND OF THE INVENTION

The use of portable telephones is becoming more common. Such devices offer convenience and freedom of movement. Cellular portable telephones are an example of portable telephones that are particularly useful in a highly mobile environment, such as an automobile, for example.

Given a freedom of movement or mobile environment, users of portable telephones are increasingly combining other activities with communicating on a portable telephone. For example, driving an automobile while conversing on a telephone. It is relatively easy to converse on a telephone while doing other activities because all the user need do is hold the telephone with one hand, speak and listen. Alternatively, hands-free features are available on telephones that eliminate the need to hold the telephone, thereby freeing both hands for other activities. However, initiating a telephone call requires more user attention than merely conversing on a telephone.

To initiate a call, the user must select a telephone number and enter the various digits into the telephone and finally start the call by pressing a key on the telephone. While this may appear simple, it actually involves holding the telephone with one hand, entering digits with the other hand, and looking at the telephone to select the correct keys to be pressed, to achieve the desired results. In a mobile environment, such as an automobile, these distractions are inconvenient, or even dangerous to the driver of the automobile.

To alleviate the foregoing problem, several inventions have be conceived and reduced to practice. U.S. Pat. No. 4,644,107 to Clowes et al. discloses a "dialess" telephone the utilizes a voice recognition system that recognizes each digit spoken by the user and dials the telephone number accordingly. Likewise, U.S. Pat. No. 4,870,686 to Gerson et al., U.S. Pat. No. 5,095,503 to Kowalski, and others have expanded on the voice recognition concept by adding voice synthesizers which echo the spoken word back to the user to verify that the spoken word was correctly recognized. Each of these systems is an improvement over the previous. However, the mobile environment, with its high ambient noise level, complicates the process of voice recognition and cause such devices to be more complex and expensive than other portable telephones. Also, the user typically must remember either the number to be called or some other phrase which identifies the desired number.

Other systems employ a voice synthesis module that utters the digits in a telephone number that has been stored in a memory in a portable telephone. This type of system has the advantage of allowing the user to scroll through a list of telephone number, listening to each in turn, and initiating a call when the desired number is heard. In such a system, the user can operate the telephone with one hand and merely listen for the desired number. Thus freeing the other hand and the eyes for other activities. However, it is not always easy or convenient to remember each telephone number and who or what it is associated with. Furthermore, since there are numerous languages and dialects, voice synthesis systems are somewhat limited in their application.

Clearly, it would be desirable to have a system that allowed for scrolling through a list of memories, each being identified by a verbal utterance that was a familiar reminder of the called party to the user, such as "home", "office", "police", etc. Furthermore, it would be desirable for such a system to be usable in any language or any dialect, and especially if the system could utter the users own words, which had been previously recorded and linked to a particular telephone number.

SUMMARY OF THE INVENTION

A portable telephone is disclosed which comprises a random access audio memory having a plurality of audio storage locations. The portable telephone further has a data memory having a plurality of data storage locations that are used to store telephone numbers that can be recalled and used in an auto-dialer function to initiate telephone calls in the portable telephone. Each audio storage location can be linked, by a controller, to one of the data storage locations. The user of the telephone can scroll through the data storage locations and each will be displayed on a display, in turn. If any of the data storage locations is linked with an audio storage location, then the controller will cause the audio memory to play back the contents of the audio storage location linked with the presently selected data storage location through a loud speaker. The audio signal that is played back is called a voice tag.

The user is able to initiate a record mode where a two second voice tag is recorded into an audio storage location that is linked to the presently selected data storage location. The microphone normally used during telephone conversations is also used as the input to the audio memory during the record mode.

For play back, a small loud speaker is provided that is driven by an amplifier so that the voice tag can easily be heard, even in a relatively noisy environment.

Scroll up and scroll down keys are provided so that the user can select a recall memory mode and then scroll through the various memory locations, listening to the recorded voice tags, until the desired call destination is heard. Then, a SEND key is pressed and the telephone initiates the telephone call in the normal manner.

Thus, a portable telephone is disclosed which allows for simple, one-handed operation to initiate a call. The use of a random access audio memory allows the telephone to function for all users, regardless of language or dialect. Furthermore, each user can record voice tags that are most easily recognizable and convenient to them.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

Figure 1:
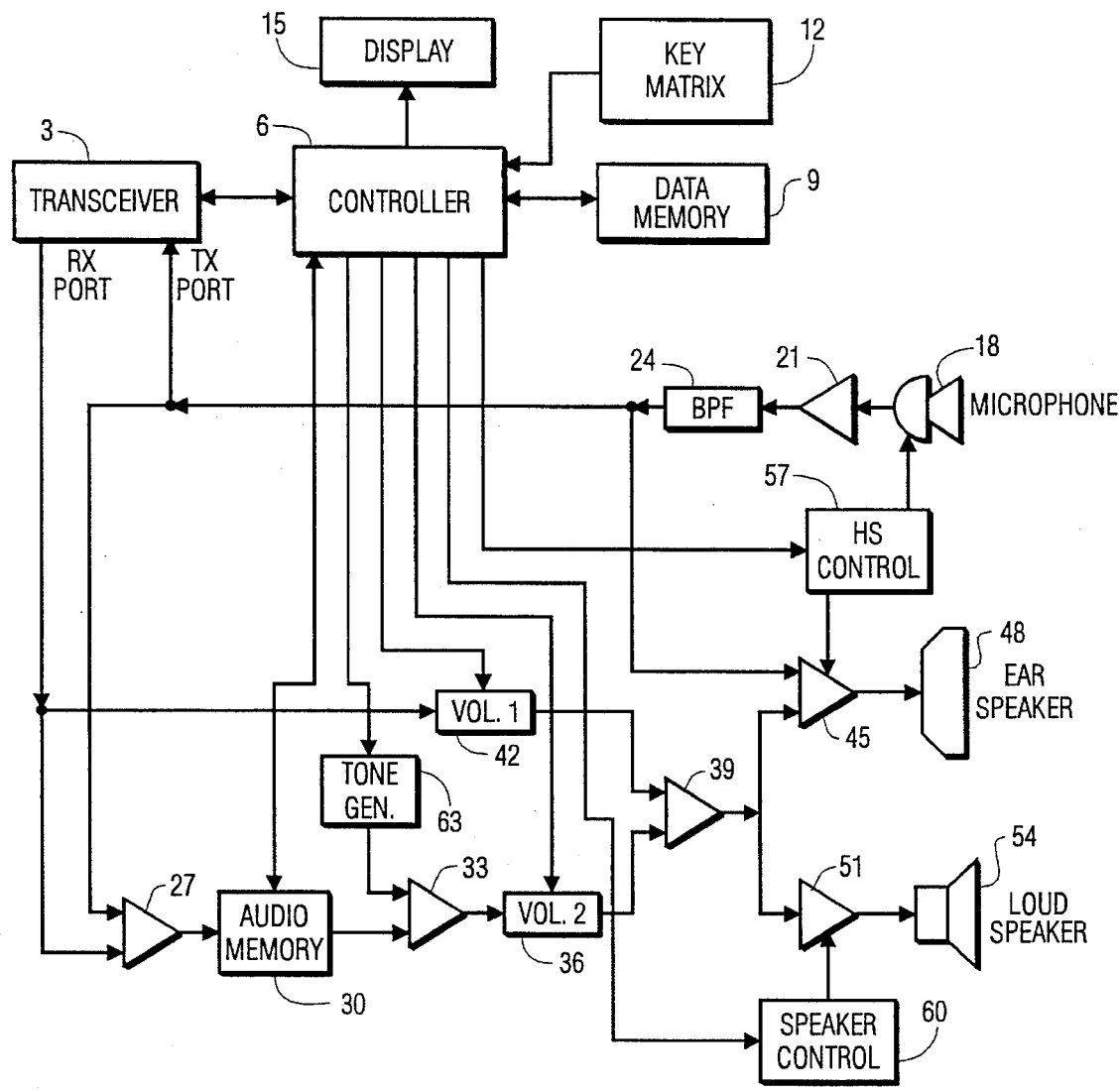
FIG. 1 is an electrical block diagram of the portable telephone in the preferred embodiment.

Reference is directed to FIG. 1 which is an electrical block diagram of the preferred embodiment of the present invention. A transceiver 3 is used to transmit and receive FM radio signals in the band of frequencies allocated for cellular telephone communications in the United States. A transmitter portion of the transceiver is modulated by an audio or data signal applied to a TX Port or input port and, further, a receiver portion of the transceiver has an RX Port or receive port to which received audio or data signals are output. The design of such a transceiver is well known in the art and will not be discussed further here. The transceiver 3 is coupled to a controller 6 and together are configured to operate in accordance with the AMPS mobile telephone standard. This standard is well known in the art and will not be discussed further here. The controller may comprise a stand alone microprocessor together with memory devices such as Random Access Memory (RAM), Read Only Memory (ROM), and Electrically Erasable Read Only Memory (EEPROM) which would interface with and couple to the microprocessor via the conventional address, data, and control buses. Alternatively, and according to the preferred embodiment, the controller 6 is a microcontroller such as the Hitachi H8/3003 which comprises the various memory circuits within the same package as the microprocessor. Hence saving size, cost, and power.

For the present embodiment, a data memory 9 is included in FIG. 1, however this memory circuit is actually comprised within the controller 6. The data memory is a portion of the EEPROM in the controller 6 and is shown diagrammatically for the sake of clarity in the following discussion and appended claims.

User control of the portable telephone in the preferred embodiment is accomplished with a display 15 and a key matrix 12. Software stored within the ROM of the controller 6 contains executable code which causes the controller to respond to key activations and, to output display commands to the display 15. The display 15 may be a conventional liquid crystal type, which has low power consumption, for example. The key matrix 12 is custom made and comprises etched printed circuit boards and membrane keypads with conductive surfaces disposed thereon such that activation of the membrane keypads causes the conductive surfaces to close circuit paths defined by conductive traces etched onto the circuit boards. The keys in the matrix, either taken singly or in combination, may alternatively be referred to as actuators The portable telephone further comprises a microphone 18 which is coupled to an amplifier 21 and further to a band pass filter 24. The signal output from the band pass filter 24 is suitably conditioned by the amplifier 21 and band pass filter 24 for driving the TX port of the transceiver 3 and the signal is controlled in amplitude and limited in frequency to optimize audio performance of the entire portable telephone. A portion of the signal output from the band pass filter 24 is fed to amplifier 45 which drives an ear speaker 48. This signal path is incorporated to proved a side tone to the user of the portable telephone. Such side tones are generally used in telephony circuits as a convenience to the user.

The received signal output from the RX port of transceiver 3 drives volume control one 42 which is coupled to the controller 6. This volume control is a portion of a multi-function cellular telephone peripheral device which is coupled to the controller 6. The multifunction peripheral serves to miniaturize the design. The multi-function peripheral may be a Sony part number CXD1272, for example. As such, the controller 6 sets the signal level output from volume control one 42 under software control.

The signal output from volume control one 42 drives the input of amplifier 39. Amplifier 39, in turn drives amplifier 45 which is coupled to ear speaker 48. Amplifier 45 has a second input from band pass filter 24. As such, ear speaker 48 reproduces both the received signal originating from transceiver 3 and a side tone signal originating from microphone 18.

Microphone 18 and ear speaker 48 are coupled to head set control circuit 57. Head set control circuit 57 is coupled to the controller 6 and allows the controller 6 to enable and disable both the microphone output signal and the ear speaker input signal simultaneously. The design effectively allows the controller 6 to turn on and turn off the headset function of the portable telephone.

Controller 6 is coupled to tone generator 63 which produces tones for indicating call progress and user interface signals to the user. The output of tone generator 63 is coupled to amplifier 33 whose output is coupled to volume control two 36. Volume control two 36 is similar to volume control one 42 in that it is a part of the multi-function peripheral device described earlier. Volume control two is coupled to controller 6 enabling controller 6 to control the signal level of signals passing through volume control two 36. The output of volume control two 36 is coupled to amplifier 39. The flow of the signal beyond amplifier 39 will be more fully described below.

The received audio signal output from the RX port on transceiver 3 is coupled to amplifier 27, together with the signal output from band pass filter 24. Amplifier 27 sums these two signals and couples them to the input of audio memory device 20. Audio memory device 30 is an integrated device comprising a nonvolatile analog storage array together with various input, output, and control circuitry. Audio memory device 30 may be an Information Storage Devices, Inc. model ISD1020A, for example. The audio memory device has the attributes of storing audio signals in a random access memory area comprising audio storage locations. The RAM area can be formed by Electrical Erasable Programmable ROM, EEPROM. The audio memory device used in the preferred embodiment comprises an analog signal storage array of ten audio storage locations each capable of storing up to two seconds duration audio signals. The audio memory 30 is coupled to controller 6 such that controller 6 controls the selection of each audio storage location and the recording of signals into each location and the playback of signals from each location. The output of audio memory 30 is coupled to the input of amplifier 33 together with the output of tone generator 63, discussed earlier.

The output of amplifier 33 passes through volume control two 36, as described earlier, and into the input of amplifier 39. Amplifier 39 also receives input from volume control one 42. As such, amplifier 39 has a combined signal input comprising received audio signals, tone signals, and audio signals played back by the audio memory 30. The output of amplifier 39 drives the input of amplifier 45 and amplifier 51. Amplifier 45, discussed earlier also receives input of the side tone signal from band pass filter 24. As such, the ear speaker 48 reproduces all the signals amplified by amplifier 39 and the side tones signals.

Amplifier 39 also drives the input of amplifier 51 which, in turn, drives loud speaker 54. As such, loud speaker 54 reproduces all the signals amplified by amplifier 39, but does not reproduce the side tone. Amplifier 51 is coupled to speaker control circuit 60 which is further coupled to controller 6. This arrangement allows controller 6 to enabled and disable the output of amplifier 51. Speaker control circuit 60, taken in conjunction with head set control circuit 57, allow the controller 6 to control whether the various audio signals are reproduced by the ear speaker or the loud speaker in various modes of operation, which will be discussed more fully below.

Figure 2A:
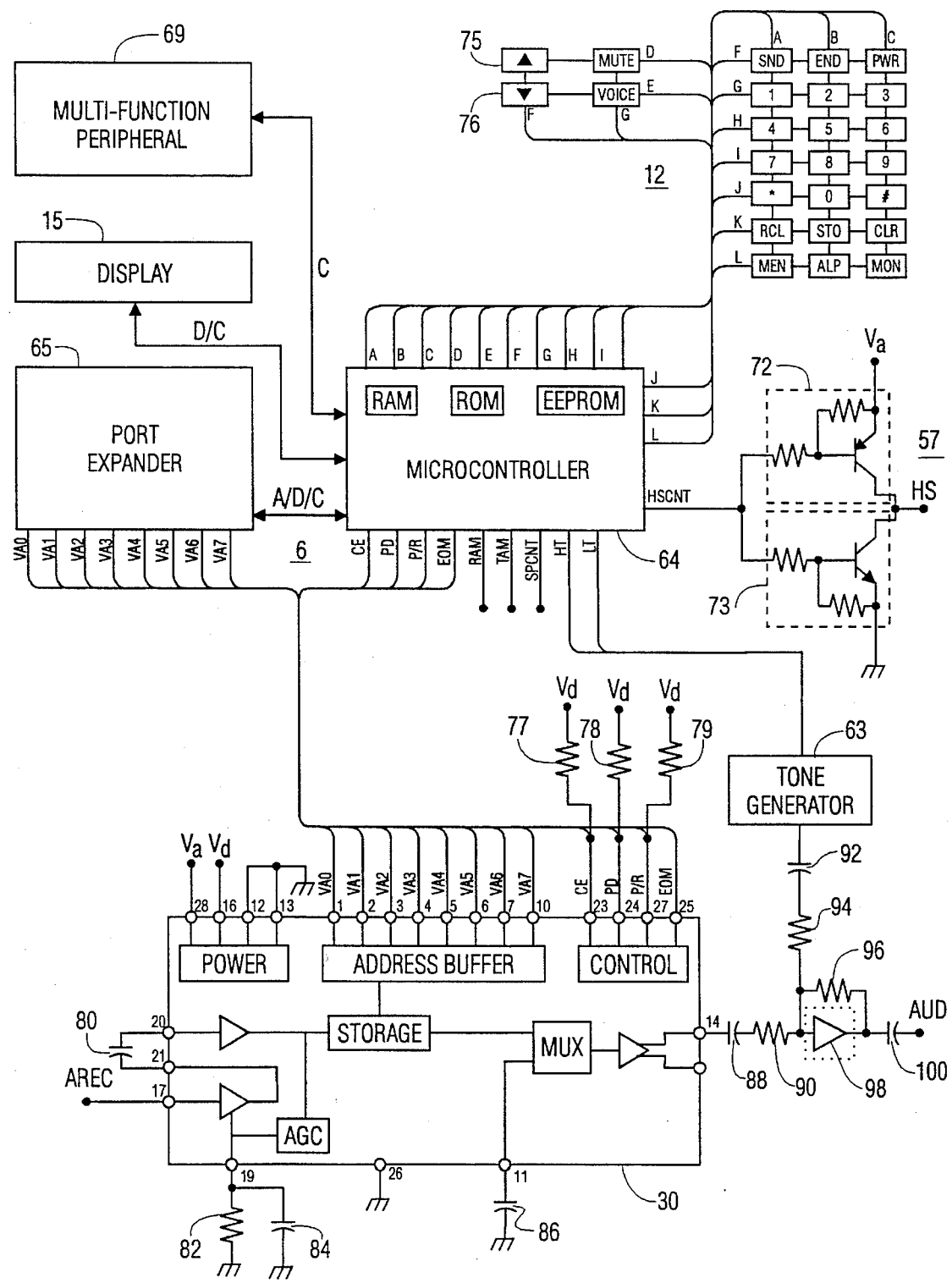
FIGS. 2A and 2B are schematic diagrams of the portable telephone in the preferred embodiment.
Figure 2B:
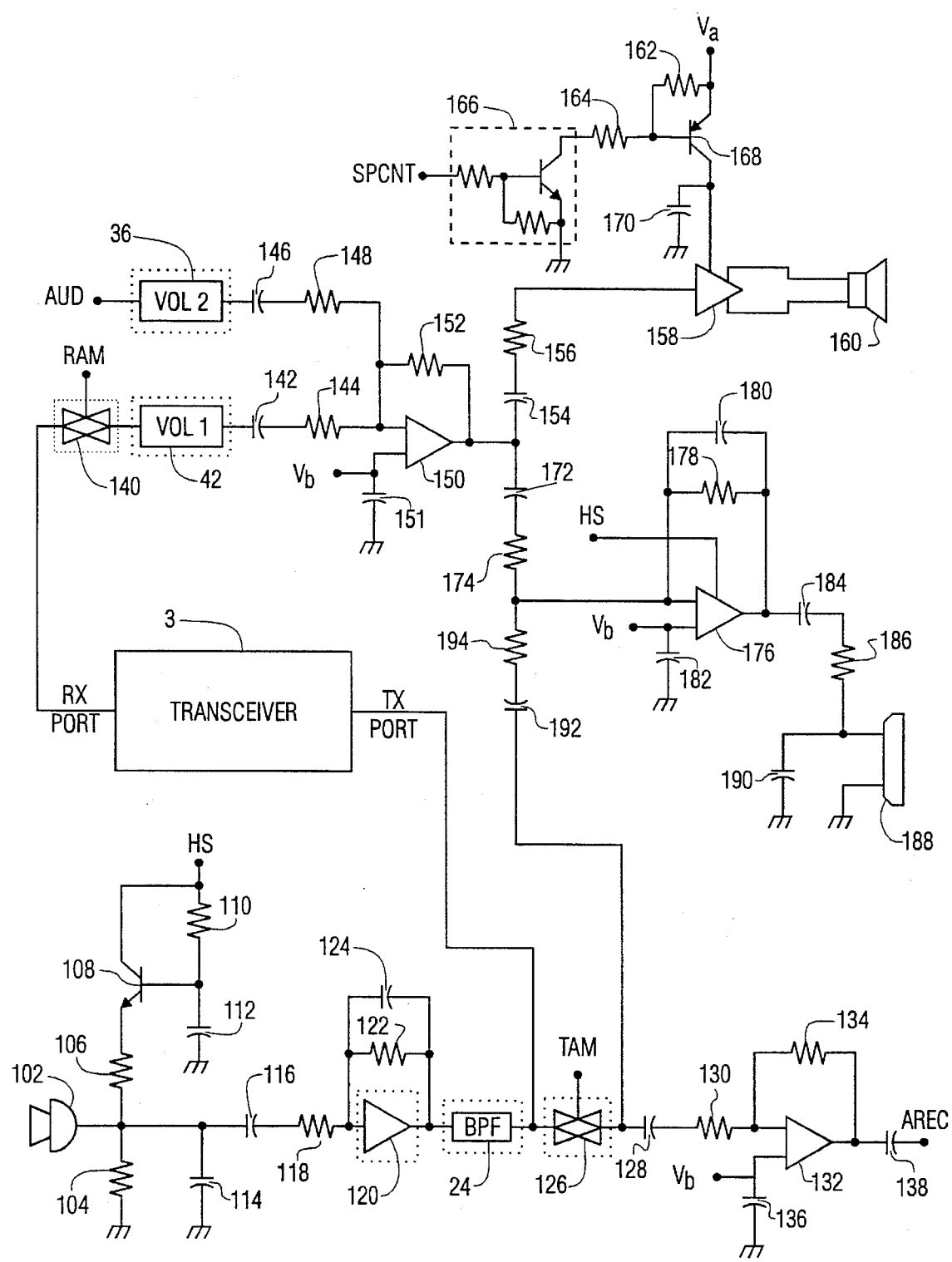

Reference is directed to FIGS. 2A and 2B which are schematic diagrams of the preferred embodiment of the present invention. In FIG. 2A, the controller 6 is comprised of two devices, the microcontroller 64 and a port expander 65. The microcontroller may be a Hitachi model H8/3003, for example, and, the port expander may be a Sony UC1547, for example. The port expander 65 is coupled to the microcontroller 64 via the standard address, data, and control buses. The port expander 65 serves to increase the quantity of input/output lines to/from the microcontroller, and, such devices are well known in the art. Display 15 is coupled to controller 6 via conventional microprocessor data and control buses. Display 15 is a custom LCD design, similar to those well known in the art.

The controller 6 is coupled to a multi-function peripheral device 69 via the control bus of the microcontroller 64. The multi-function peripheral 69, hereinafter referred to as "MFP", is not a part of the controller 6, but rather, is an aggregation of circuit components that functions to reduce the parts count, size, and weight of the portable telephone. The multifunction peripheral may be a Sony model CXD1272, for example.

The controller 6 is coupled to key matrix 12. The interface is via a key matrix driver built into microcontroller 64 wherein input lines map out to a 25 key matrix. The key matrix 12 comprises the following keys: SEND, END, PWR, numerals 0–9, "*", "#", RCL, STO, CLR, MENU, ALPHA, MON, MUTE, VOICE, up, denoted by the symbol "▲", and down, denoted by the symbol "▼".

Controller 6 has several other outputs which are used to drive various circuit components. Each of these outputs will be discussed hereinafter.

The controller 6 is coupled to the audio memory 30 via the address and control buses. Address lines VA0 through VA7 are used to select a particular audio storage location. Additionally, the audio memory is interface via a chip enable signal CE, a power down signal, PD, that allows the controller to minimize power consumption while the device is idle, a playback/record function selector, P/R, which sets playback and record modes, and an end of message, EOM, output which informs the controller 6 that a message period has expired and further, informs the controller that all audio storage locations are full. The CE, PD, and P/R signals are all pulled up to a positive digital power supply voltage by pull-up resistors 77, 78, and 79 which may be 100 kohms, for example.

For optimum performance in the preferred embodiment of the present invention, the audio memory 30 has certain peripheral components added to complete the circuit. A 470 kohm resistor 82 in parallel with a 4.7 microfarad capacitor 84 couple to audio memory 30 pin 19 to ground, to control the time constant of an automatic gain control circuit inside the audio memory 30. A 1.0 microfarad capacitor 80 couples pills 21 and 20 in the audio memory 30 for the purpose of utilizing an internal preamplifier. A 0.1 microfarad capacitor 86 ties pin 11 of the audio memory 30 to ground so as to provide an alternating current ground to an input of an internal multiplexor. Additionally, the audio memory 30 requires separate analog supply voltage $V_a$ and digital supply voltage $V_d$ according to the manufacturers recommendation to reduce digital noise in the various audio signal paths. The audio record input signal, AREC, is applied to pin 17 of the audio memory 30 and the audio playback signal is output pin 14 of the audio memory 30.

The output of the audio memory 30 is coupled to an amplifier 98 via a series capacitor 88 and resistor 90. Suitable values for these components are 0.1 microfarads and 68 kohms respectively. Amplifier 98 is an element in the MFP, as is noted by the dotted outline in the drawings. Such a dotted outline is indicative of all components which are elements of the MFP. The amplifier 98 has a 33 kohm resistor 96 tied between its output and input to set the gain of the circuit. The output of amplifier 98 is coupled through a 0.1 microfarad capacitor 100 to provide an audio signal, AUD, to other components in the portable telephone. The input of amplifier 98 is also driven by the a tone generator 63 through a series 0.1 microfarad capacitor 92 and a 120 kohm resistor 94. The tone generator is controlled by two digital outputs from the controller 6, HT and LT which enable and disable a high tone and a low tone signal. The tone generator may be of any conventional designs, such as a R-C oscillator design, for example.

The controller 6 has a head set control output, HSCNT, which controls the operation of the ear speaker 188 and microphone 102. The controller output is buffered by a complimentary pair of transistor switching devices 72 an 73. The NPN device is an NEC, Corp. model GA1L4M and the PNP device is an NEC, Corp. GN1L4M. This complimentary pair serve to buffer and invert the HSCNT output from the controller 6 by producing a head set drive signal, HS. These two switching devices together form the headset control circuit 57 in FIG. 1.

FIG. 2B is a continuation of FIG. 2A and details other circuit elements. Condenser microphone 102 is biased by a pair of resistors 106 and 104. Microphone 102 may be a Sony, Corp. model DE-2383, for example. Resistor 106 and 104 may be 27 kohm and 10 kohm respectively, for example. These resistors form a voltage divider to bias the condenser microphone 102 into its operating range. The current to drive the aforementioned voltage divider is provided by the circuit comprising a 1000 ohm resistor 110, a 4.7 microfarad capacitor 112, and an NPN transistor 108. Transistor 108 may be an NEC, Corp. model 2SC4177-L6, for example. The collector of transistor 108 is driven by the head set signal, HS, as is the base of transistor 108 through resistor 110. Capacitor 112 is connected between the base of transistor 108 and ground to suppress switching transients in the circuit. The output of the circuit is taken from the emitter of transistor 108, and enables and disables the direct current bias to microphone 102, thereby enabling and disabling the function of the microphone, according to the state of the head set signal HS.

The microphone 102 output is coupled to ground through a 0.0033 microfarad capacitor 114 which acts as a high pass filter and suppresses transients. The microphone output is also coupled to the input of amplifier 120 through a series 0.022 microfarad capacitor 116 and 22 kohm resistor 118. Amplifier 120 is an element in the MFP. The feedback circuit of amplifier 120 comprises a 82 picofarads capacitor 124 in parallel with a 220 kohm resistor 122 coupled between the output and input of amplifier 120. The feedback circuit sets the gain of amplifier 120 and acts as a low pass filter. The output of amplifier 120 is coupled to an audio band pass filter 24 which is also a portion of the MFP. The foregoing amplifier and band pass filter condition the microphone audio signal to drive the transceiver 3.

The output of band pass filter 24 is coupled to the TX port of the transceiver 3. The presence of a signal at the input of the transceiver TX port is a function of the state of the HS signal described herein before. The output of band pass filter 24 is further coupled to bilateral switch 126, which is also an element of the MFP. Bilateral switch 126 is controlled by the TAM signal which is output from controller 6. The TAM signal enables and disables the microphone signal beyond bilateral switch 126, under the control of controller 6.

The output of bilateral switch 126 drives the inverting input of amplifier 132 through a series 0.1 microfarad capacitor 128 and 56 kohm resistor 130. The gain of amplifier 132 is set by a 22 kohm feedback resistor 134. Amplifier 132 may be a differential amplifier such as the model M5223FP as manufactured by Mitsubishi, Corporation. The non-inverting input of amplifier 132 is coupled to a bias voltage, $V_b$, that is approximately one-half of the analog supply voltage. The non-inverting input of amplifier 132 is further decoupled to ground through a 0.1 microfarad resistor 136. The output of amplifier 132 is coupled through a 0.1 microfarad resistor 138 to yield the audio record signal, AREC, which drives the input of the audio memory 30 described herein before.

Referring back to the output of bilateral switch 126, this signal is also coupled to amplifier 176 through a 0.1 microfarad capacitor 192 in series with 270 kohm resistor 194. This path provides the side tone, which was discussed earlier.

The foregoing circuit description allows for the microphone 102 audio signal to be enabled and disabled by the controller 6. Furthermore, the signal is coupled to the transceiver 3 TX port so that it can be transmitted by activating a transmit function if the transceiver 3. In addition, the microphone audio signal can be selectively coupled to the side tone path and audio memory 30 by activation and deactivation of bilateral switch 126, under control of controller 6.

Received audio is output from the RX port of transceiver 3 and coupled to the input of bilateral switch 140. Bilateral switch 140 is an element of the MFP 69. The received signal flow through bilateral switch 140 is controlled by the controller 6 through the RAM signal, thereby enabling and disabling the received audio function of the present circuit. The output of bilateral switch 140 is coupled to the input of volume control one 42. Volume control one is an element in the MFP 69, and the amplitude of the signal passed to the output of volume control one 42 is controlled by the controller 6. The output of volume control one 42 is coupled to the input of amplifier 150 through a 0.1 microfarad capacitor 142 in series with a 22 kohm resistor 144. In addition, the audio memory output signal, AUD, is coupled to the input of amplifier 150 through a similar volume control two 36 in series with a 0.1 microfarad capacitor 146 in series with a 22 kohm resistors 148. Volume control two 36 is also an element of MFP 69 and under control of the controller 6.

The gain of amplifier 150 is set by a 22 kohm feedback resistor 152. Amplifier 152 may be a differential amplifier such as the model M5223FP as manufactured by Mitsubishi, Corporation. The non-inverting input of amplifier 150 is coupled to a bias voltage, $V_b$, that is approximately one-half of the analog supply voltage. The non-inverting input of amplifier 150 is further decoupled to ground through a 0.1 microfarad capacitor 151. The output of amplifier 150 comprises the received audio signal output from transceiver 3 and the playback audio from audio memory 30, and the tones signals output from tone generator 63. The amplitude of these signals is under the control of controller 6 via volume controls one 42 and two 36. Furthermore, the received audio signal is gated by bilateral switch 140 under control of controller 6.

The output of amplifier 150 is coupled to the input of amplifier 158 through a 0.1 microfarad capacitor 154 in series with a 68 kohm resistor 156. Amplifier 158 may be a model NJM2073 as manufactured by Japan Radio Corp. Such an amplifier is suitable for directly driving a low impedance loud speaker. Amplifier 158 comprises its own internal feedback, so that no external feedback resistor is required. The output of amplifier 158 is directly coupled to loud speaker 160 which may be a model SU-28W10014 as manufactured by Line Denki. Such as speaker is compact an suitable for comfortable listening several feet away from the portable telephone.

The audio output of speaker 160 is enabled and disabled by enabling and disabling the direct current power to amplifier 158. This is done under control of the controller 6 through the speaker control signal, SPCNT. The SPCNT signal drives an NPN switching device 166 which may be model GA1L4M as manufactured by NEC. Corp. This device inverts the SPCNT signal output from the controller 6 and drives the base of transistor 168 through a 1000 ohm resistor 164. Transistor 168 may be a model 25B1115-YK as manufactured by NEC, Corp. Transistor 168 has its emitter coupled to the analog supply voltage, $V_a$, and the base biased to the analog supply voltage through a 4.7 kohm resistor 162, thereby holding the collector-emitter junction in the cut-off region. The collector of transistor 168 is tied to the power supply lead of amplifier 158. Assertion of the SPCNT signal causes switching device 166 to conduct, thereby reducing the base voltage of transistor 168 and forward biasing the base-emitter junction. This action supplies current to amplifier 158, thereby enabling the audio signal to loud speaker 160. Additionally, the collector of transistor 168 is coupled to ground through a 16 microfarad capacitor 170 to decoupled the power supply of amplifier 58.

Referring now to amplifier 176, which receives its input of the side tone signal from bilateral switch 126 and the various audio signals from the output of amplifier 150, described earlier. Amplifier 176 may be a differential amplifier such as the model M5223FP as manufactured by Mitsubishi, Corp. The gain of amplifier 176 is controlled by a feedback circuit comprising a 330 picofarad capacitor 180 in parallel with a 180 kohm resistor 178 coupled between its output and input. The non-inverting input of amplifier may be coupled to ground with a 0.0022 microfarad capacitor 182 and further coupled to a bias supply voltage, $V_b$, equal to approximately one half of the analog supply voltage. The output of amplifier 176 is coupled to ear speaker 188 through a 10 microfarad capacitor 184 in seiers with a 560 ohm resistor 186. Ear speaker 188 may be a model CD20AARC-H-220 as manufactured by Taiyo Yuden. The input of ear speaker 188 is coupled to ground through a 0.1 microfarad capacitor 190 to suppress transients. The audio signal reproduced by ear speaker 188 is enabled and disabled by the head set signal, HS. This signal supplied the direct current power to amplifier 176 and is under control of controller 6.

Figures 3, 3A, 3B:
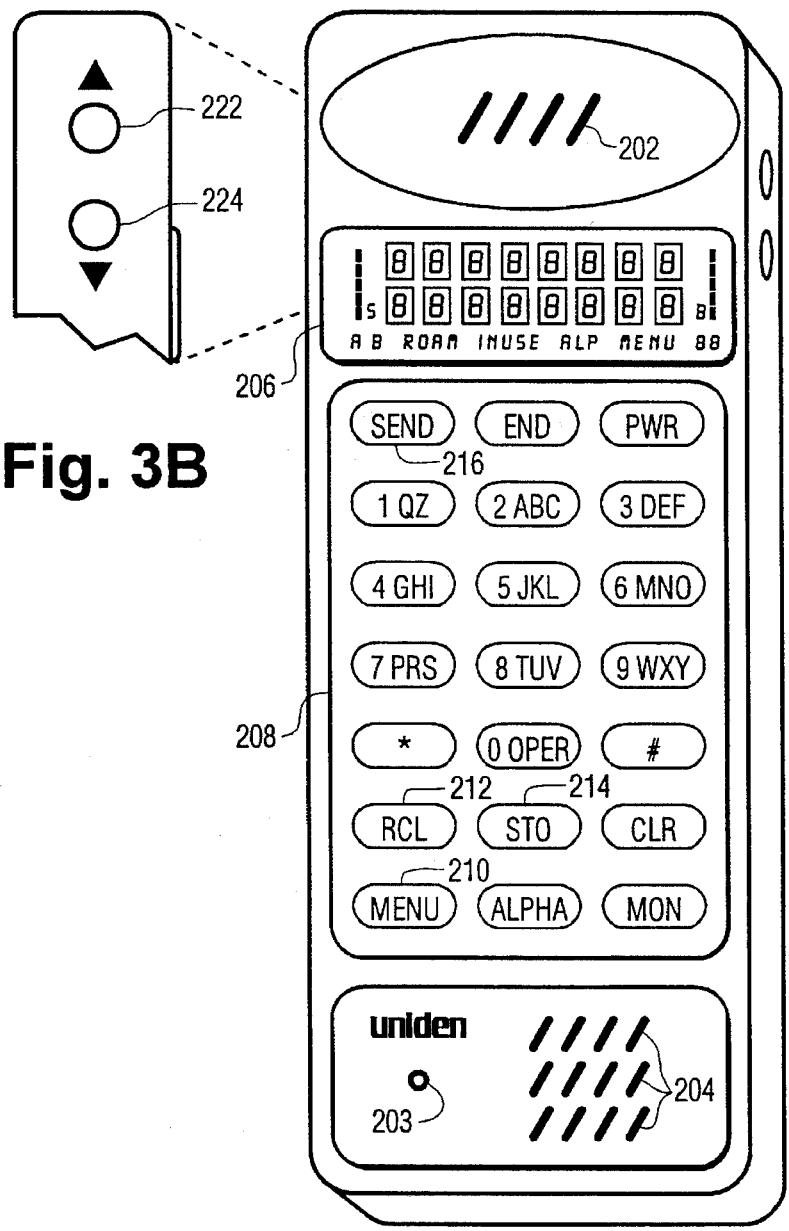
FIGS. 3, 3A, and 3B are diagrams of the portable telephone in the preferred embodiment.

Reference is directed to FIG. 3 which is a diagram of the portable telephone 200 in the preferred embodiment of the present invention, particularly identifying the various components of the face plate. The face plate serves as the head set in the preferred embodiment. It comprises the ear speaker 202, the microphone 203, the loud speaker 204, the display 206, and a portion of the key matrix 208. Incorporated in the face plate portion of the key matrix 208 are twenty-one keys including the digits "0" through "9" and the special characters "*" and "#" which are conventionally found on a telephone. Additionally, several keys are present which are used in the preferred embodiment, these include "MENU" 210, "RCL" 212, "STO" 214, and "SEND" 216. The function of these keys will be discussed hereinafter. FIG. 3A shows a portion of the right side view of the portable telephone 200. Located here are two additional keys in the key matrix. These include the "MUTE" 218 and "VOICE" 220 keys. These keys are located on the side of the portable telephone as a convenience to the users. FIG. 3B shows a portion of the left side of the portable telephone 200. Located here are two additional keys in the key matrix. These include the up key 222 and the down key 224. The up key is identified by the symbol "▲" and the down key is identified by the symbol "▼".

Figure 4:
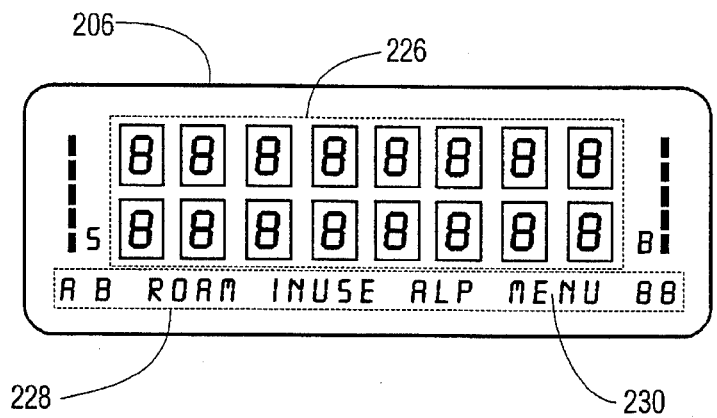
FIGS. 4, 5, and 6 are diagrams of the display in the preferred embodiment.
Figure 5:
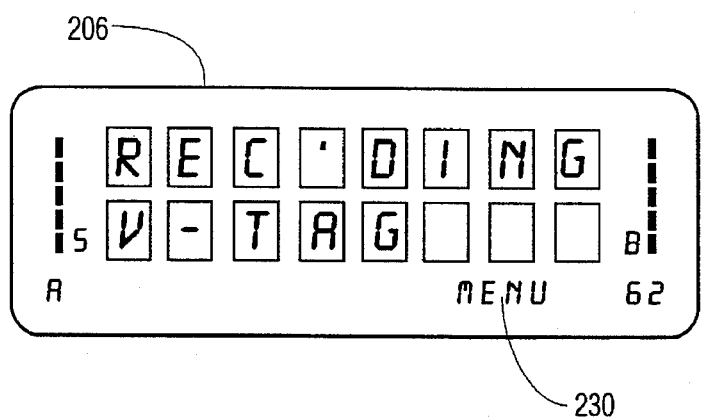
Figure 6:
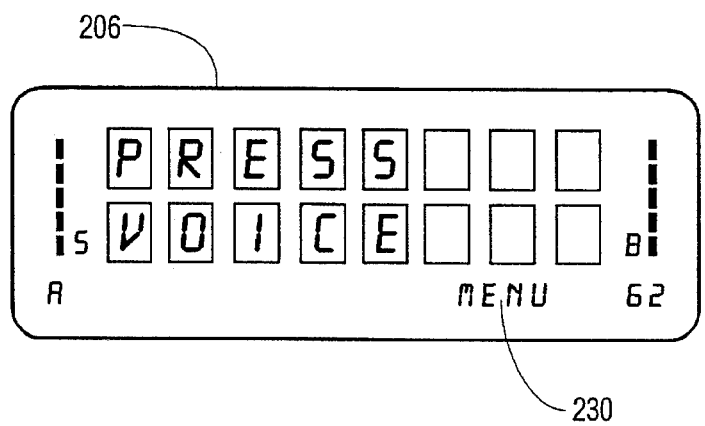

Reference is directed to FIGS. 4, 5, and 6 which are detailed views of the display 206 in the preferred embodiment. Referring to FIG. 4, the display comprises an alphanumeric display portion 226 which comprises sixteen characters. The display 206 further comprises a plurality of icons 228 which are common in portable telephones and a "MENU" icon 230 which is useful in the preferred embodiment of the present invention. FIG. 5 and 6 are examples of menu messages used in the preferred embodiment and are intended as examples only.

The controller controls the operation of the portable telephone as described earlier. The following discussion describes the operation of the software in the preferred embodiment as it relates to the claimed invention.

Figure 7:
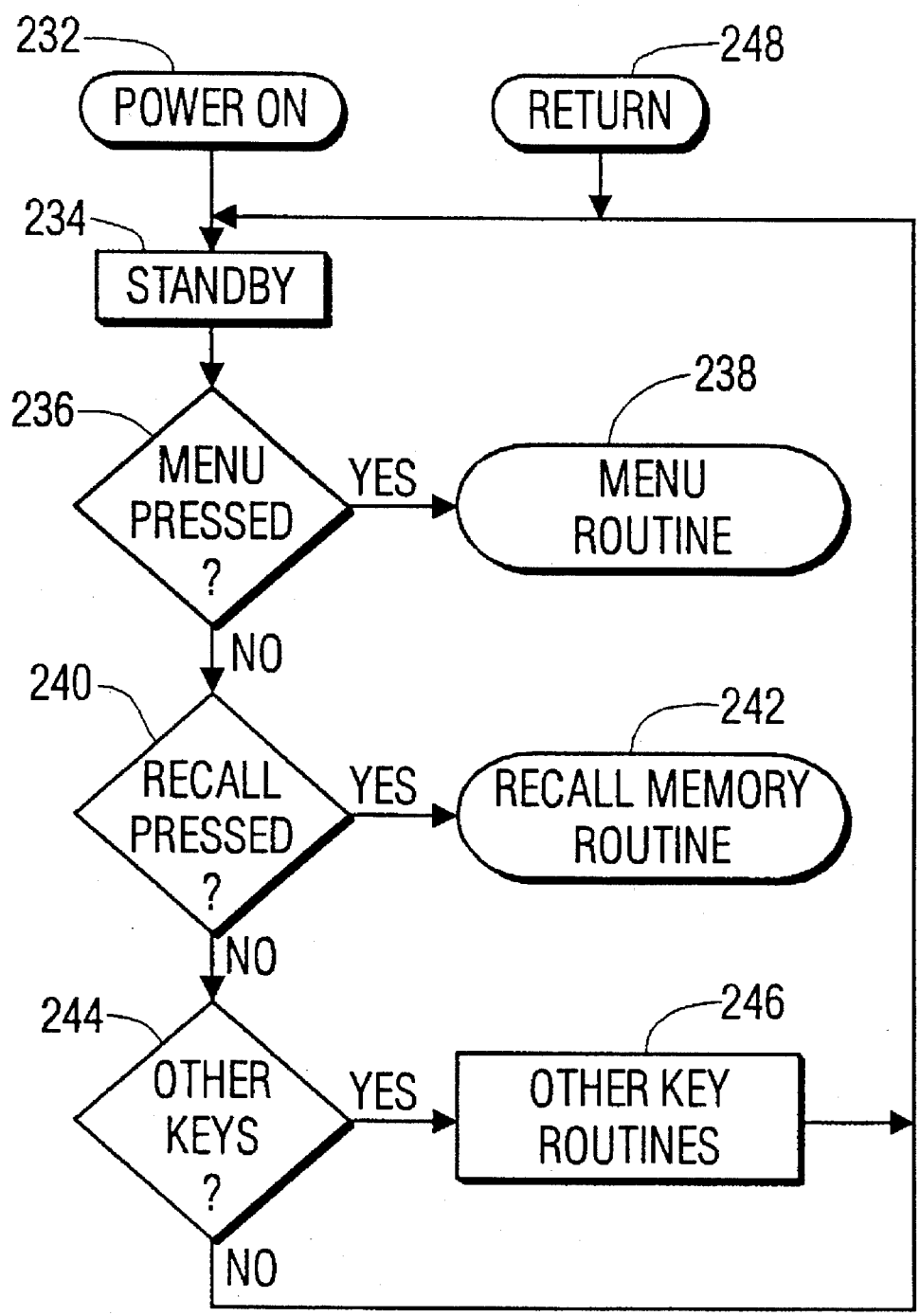
FIGS. 7 through 14 are a flow diagrams of the various software routines in the preferred embodiment.

Reference is directed to FIG. 7 which is a software flow diagram of the main standby loop. The standby loop is the default routine from which other software routines are called. When power is switched on at step 232, the telephone automatically activates and acquires a telephone system on which to communicate. This process is well know in the art. Next, the controller enters the standby mode at step 234 and scans through a loop waiting for a key press or other interrupts. At step 236, the controller checks to see if the "MENU" key has been pressed. If the "MENU" key has been pressed, the controller executes the menu routine at step 238. This routine is discussed later. If, at step 236, "MENU" has not been pressed, the controller checks to see if the "RCL" key has been pressed at step 240. If "RCL" has been pressed, the controller executes the recall memory routine at step 242. The recall memory routine is discussed later. If, at step 240, "RCL" has not been pressed, the controller checks to see if any other keys have been pressed at step 244. If other keys have been pressed, the controller executes a routine appropriate for the key pressed at step 246. Upon completion of the required routine, the controller returns to the standby mode at step 234. If, at step 244, no other key has been pressed, the controller returns to step 234 and renters the standby mode. The aforementioned loop is repeated indefinitely, or until power is switched off. Additionally, in FIG. 7, the standby loop comprises step 248 at which point the various other routines return upon their completion.

Figure 8:
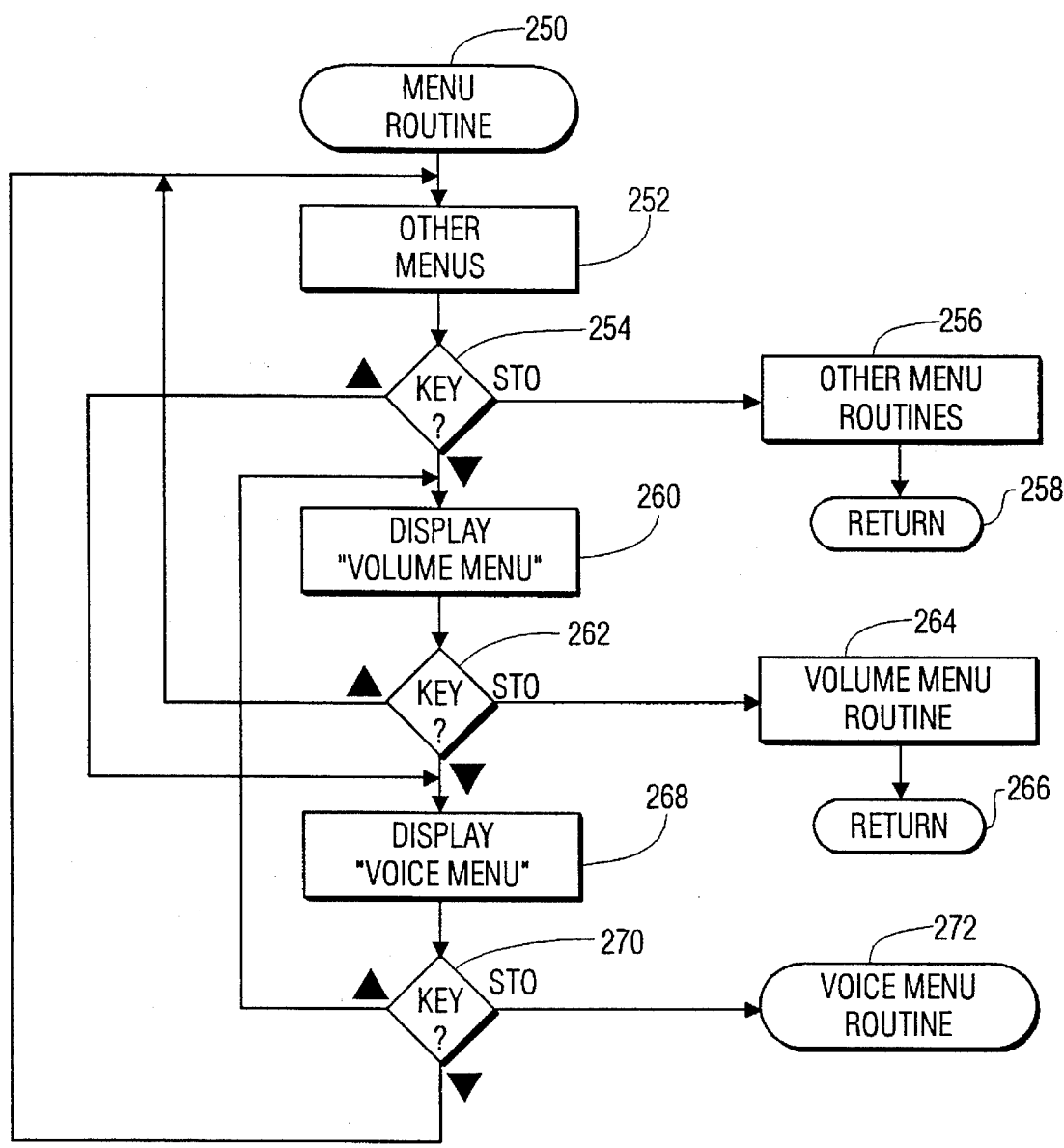

Reference is directed to FIG. 8, which is a software flow diagram of the menu routine in the preferred embodiment. The menu routine is entered from the standby loop at step 250. The menu routine allows the user to scroll through a list of menu choices by pressing the "▲" and "▼" keys, and then pressing "STO" to make a selection. Step 252 is a place holder indicating that there are other menu choices available which are not germane to the present invention. If at step 254, the "STO" key is pressed, for any of the other routines, the appropriate routine will be executed at step 256. Upon completion of that routine, control is returned to the main standby loop at step 258 which returns to step 248 in FIG. 7.

Referring, again, to step 254 in FIG. 8, if the user presses the "▼" key, the controller displays "VOLUME MENU" on the display at step 260 and the controller proceeds to step 262 to check for a key press. At step 254, if the user presses the "▲" key, the controller goes to step 268 and displays 637 VOICE MENU" on the display. Then subsequently goes to step 270 to check for a key press. Without describing every single possible path the controller can follow through the menu routine, the method is to scroll through a list of menu choices, either upwardly or downwardly by pressing either the "▲" or "▼638 keys repeatedly until the desired menu choice is displayed, and then pressing "STO" to select a particular item. For example, if the "VOLUME MENU" choice is selected at step 262, the controller executes the volume menu routine at step 264 and then returns to the main standby loop at step 266, which returns to step 248 in FIG. 7. Alternatively, if the user presses "STO" at step 270, when "VOICE MENU" is displayed on the display, the controller proceeds to the voice menu routine at step 272.

Figure 9:
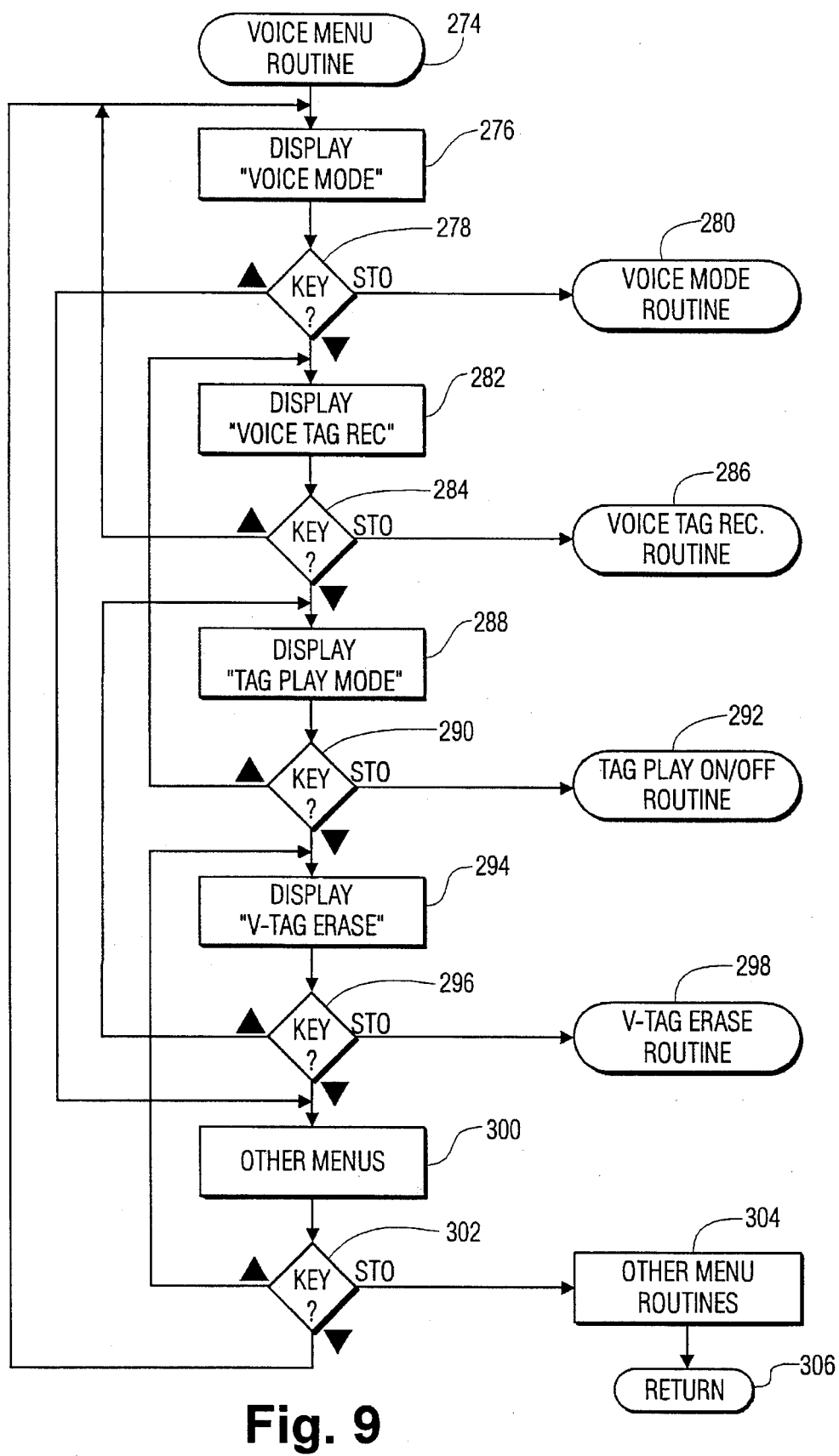

Selection of the voice menu causes the controller to transfer to step 274 in FIG. 9, which is a software flow diagram of the voice menu routine. The routine is entered a step 274 and proceed to display "VOICE MODE" at step 276. The controller then checks for a key press at step 278. If "STO" is pressed, the controller executes the voice mode routine at step 280. Alternatively, at step 278, the user may select the "▲" or "▼" keys to scroll through the other menu choices. As discussed in the description of FIG. 8, the menu selection routine merely allows the user to scroll through a list and press "STO" when the desired menu option is displayed to cause the controller to execute the desired option. In the present voice menu routine, the list of options includes: "VOICE MODE" displayed at step 276, selected at step 278, and executed at step 280; "VOICE TAG REC" displayed at step 282, selected at step 284 and displayed at step 286; "TAG PLAY MODE" displayed at step 288, selected at step 290, and executed at step 292; "V-TAG ERASE" displayed at step 294, selected at step 296, and executed at step 298; and finally, other menus, not germane to the preferred embodiment, which are displayed at step 300, selected at step 302, and executed at step 304. The other menu routines are each executed and return to the main standby loop at step 306 which returns to step 148 in FIG. 7. Each of the routines selectable in the forging discussion will described more fully below.

Figure 10:
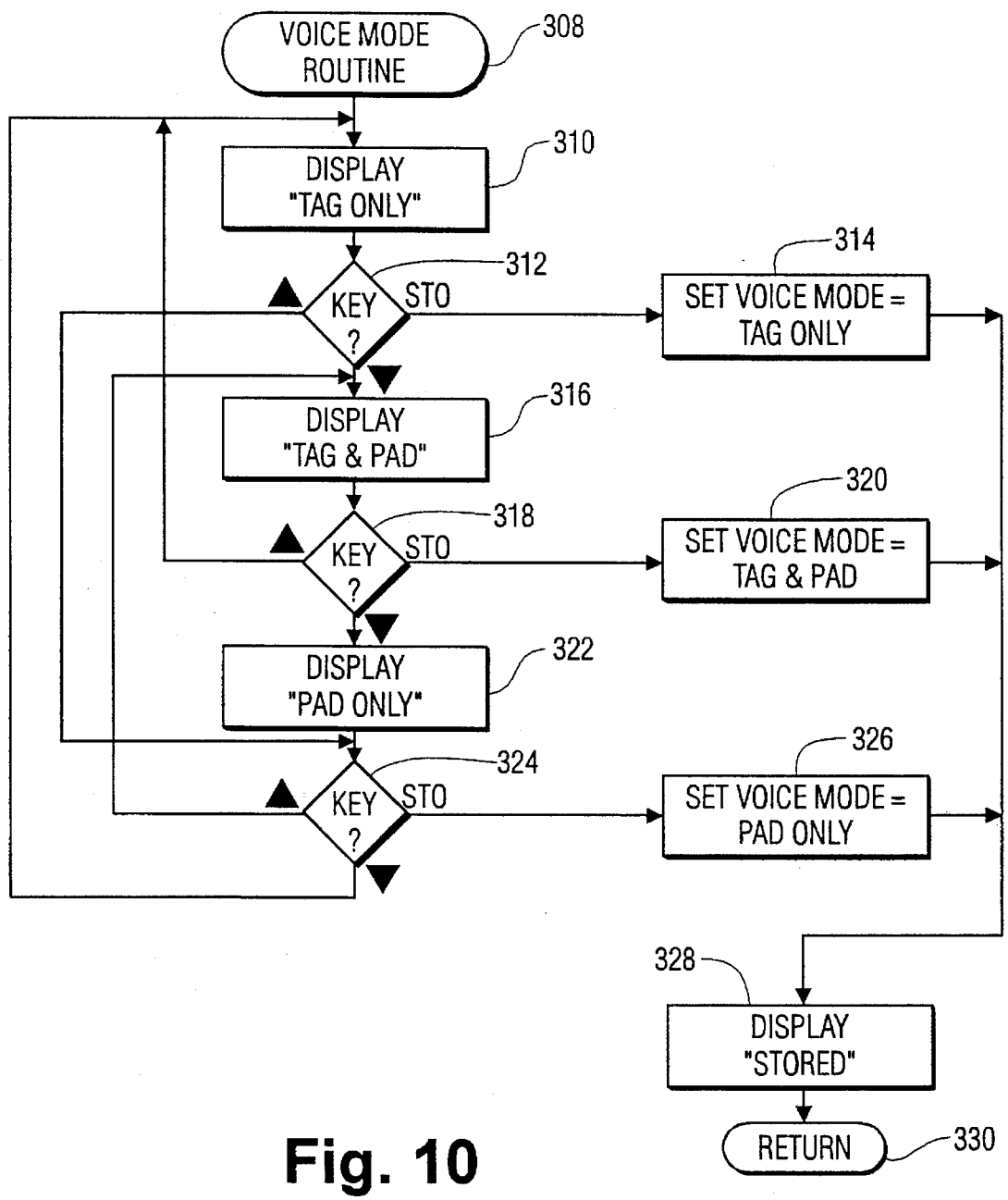

Reference is directed to FIG. 10 which is a software flow diagram of the voice mode routine. The voice mode routine is entered at step 308 from step 280 in FIG. 9. Initially, the controller displays "TAG ONLY" on the display as the first menu option at step 310. The controller then proceeds to step 312 to check for a key press. In a fashion similar to the other menu flows, the user has the option of scrolling upwardly or downwardly through the list of menu options by pressing either the "▲" or "▼" keys repeatedly until the desired option is displayed. Upon seeing the desired option, the "STO" key is pressed to make the selection. For the voice mode routine, the options are "TAG ONLY" at step 310, wherein the choice is made at step 312, "TAG & PAD" at step 316, wherein the choice is made at step 318, and, "PAD ONLY" at step 322 wherein the choice is made at step 324. If, at step 312, "STO" is pressed, the controller sets the voice mode equal to "tag only" at step 314, alternatively, if the user presses "STO" at step 318, the controller sets the voice mode equal to "tag & play" at step 320, and the last alternative is for the user to press "7STO" at step 324 which causes the controller to set the voice mode equal to "pad only" at step 326. Regardless of which mode the user selected at any of steps 314, 320, or 326, the controller displays "STORED" at step 328 and the control of the software returns to the main standby loop at step 330, which returns to step 248 in FIG. 7.

Figure 11:
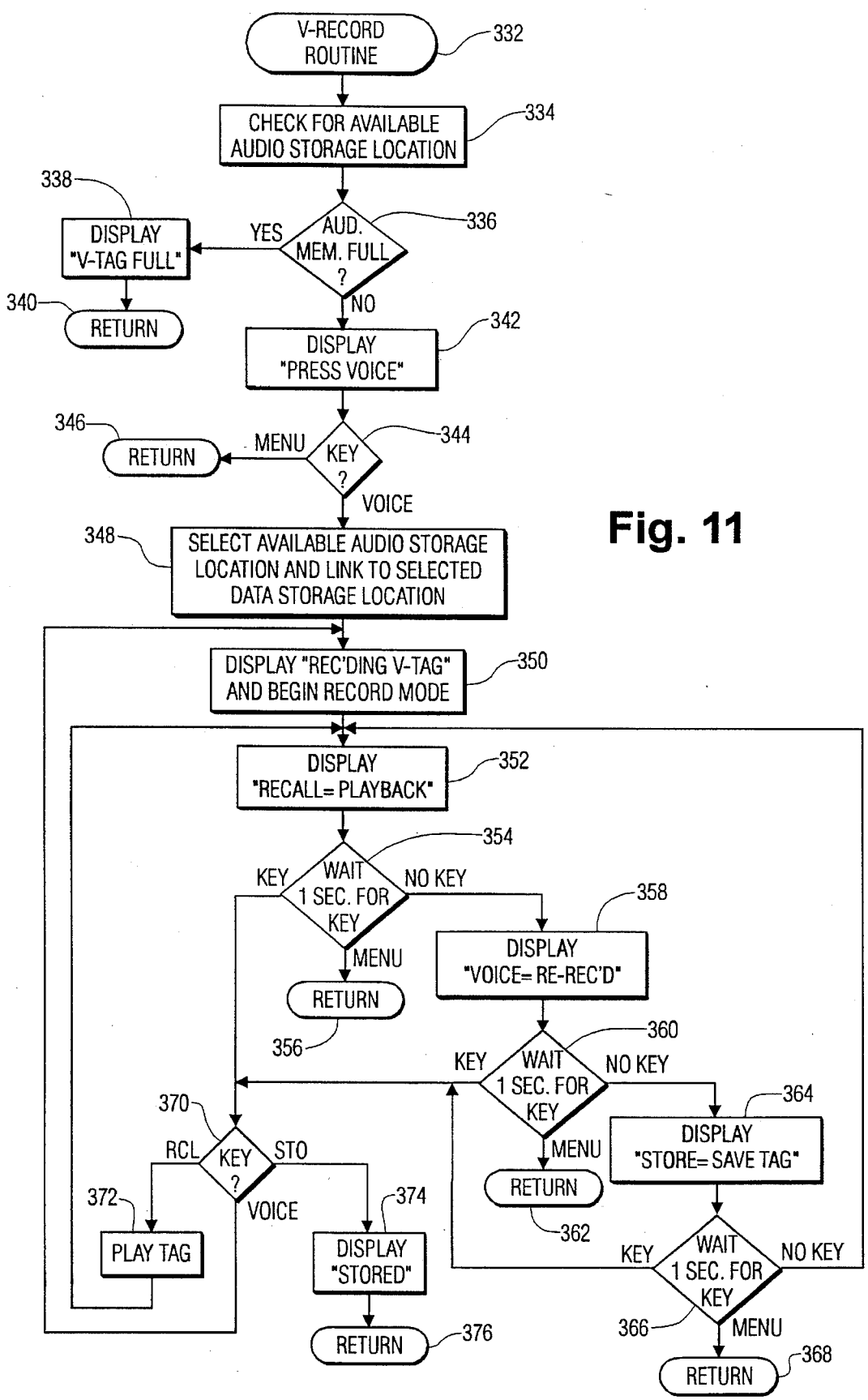

Reference is directed to FIG. 11, which is a software flow diagram of the voice tag record routine in the preferred embodiment. This routine allows the user to program a voice message, or tag, which is linked with the presently selected one of the plurality of data storage locations. The presently selected data storage locations is selected according to the routine described in FIG. 14. The voice record routine is entered at step 332 from step 286 in FIG. 9. Upon entering the voice tag record routine, the controller checks for available audio storage locations at step 334. If the audio memory is full at step 336, the controller displays "V-TAG FULL" on the display at step 338 for a short period of time, and the control of the software is returned to the main standby loop at step 340 which returns to step 248 in FIG. 7. Alternatively, if there is an audio memory storage location available at step 336, the controller displays "PRESS VOICE" at step 342 to alert the user that then portable telephone is ready to record a message. At step 344, the controller waits for a key press. If the "MENU" key is pressed, the routine is exited at step 346, and the control is returned to the main standby loop. If the "VOICE" key is pressed at step 344, the controller selects an available audio storage location and links it to the presently selected data storage location at step 348. The linking may be accomplished by a pointer to the linked storage location, for example. Having linked the storage locations, the controller displays "REC'DING V-TAG" on the display and begins recording the audio signal received from the microphone at step 350. At the end of the record period, 2 seconds in the preferred embodiment, the controller begins a series of displays which allow the user a choice of options about what to do regarding the recorded message.

At step 352, the controller displays "RECALL=PLAY-BACK" and proceeds to step 354 to wait one second for a key to be pressed. If no key is pressed, the controller proceeds to step 358 and displays "VOICE=RE-REC'D" and then to step 360 to wait anther second for a key press. If no key is pressed at step 360, the controller proceeds to step 364 and displays "STORE=SAVE TAG" and then proceeds to step 366 to wait for one second for a key to be pressed. If no key is pressed, the flow will recirculate to step 352 and the controller will sequentially display the three foregoing message until a key is pressed, commanding the controller to take action. If at any time, the "MENU" key is pressed, the controller will fall to one of step 356, 362, or 368, depending on where in the loop the controller is at the time the key is pressed. Each of steps 356, 362, and 386 will return control to the main standby loop.

It the "RCL" or "STO" are pressed in the foregoing loop at any of steps 354, 360, or 366, the controller proceeds to step 370. Step 370 checks for the particular key pressed. If the "RCL" key is pressed, the controller goes to step 372 and plays the just recorded audio tag over the loud speaker for review by the user. Upon playing the tag, the control recirculates to step 352 to offer the selection process again. Returning to step 370, if the user pressed voice, the controller returns to step 350 and allows the user to re-record the audio message. Finally, at step 370, if the user pressed "STO" the controller displays "STORED" on the display at step 374 and proceeds to step 376 to return to the main standby loop. At this point, the recorded audio message would have been saved and linked to the presently selected one of said plurality of data storage locations.

Figure 12:
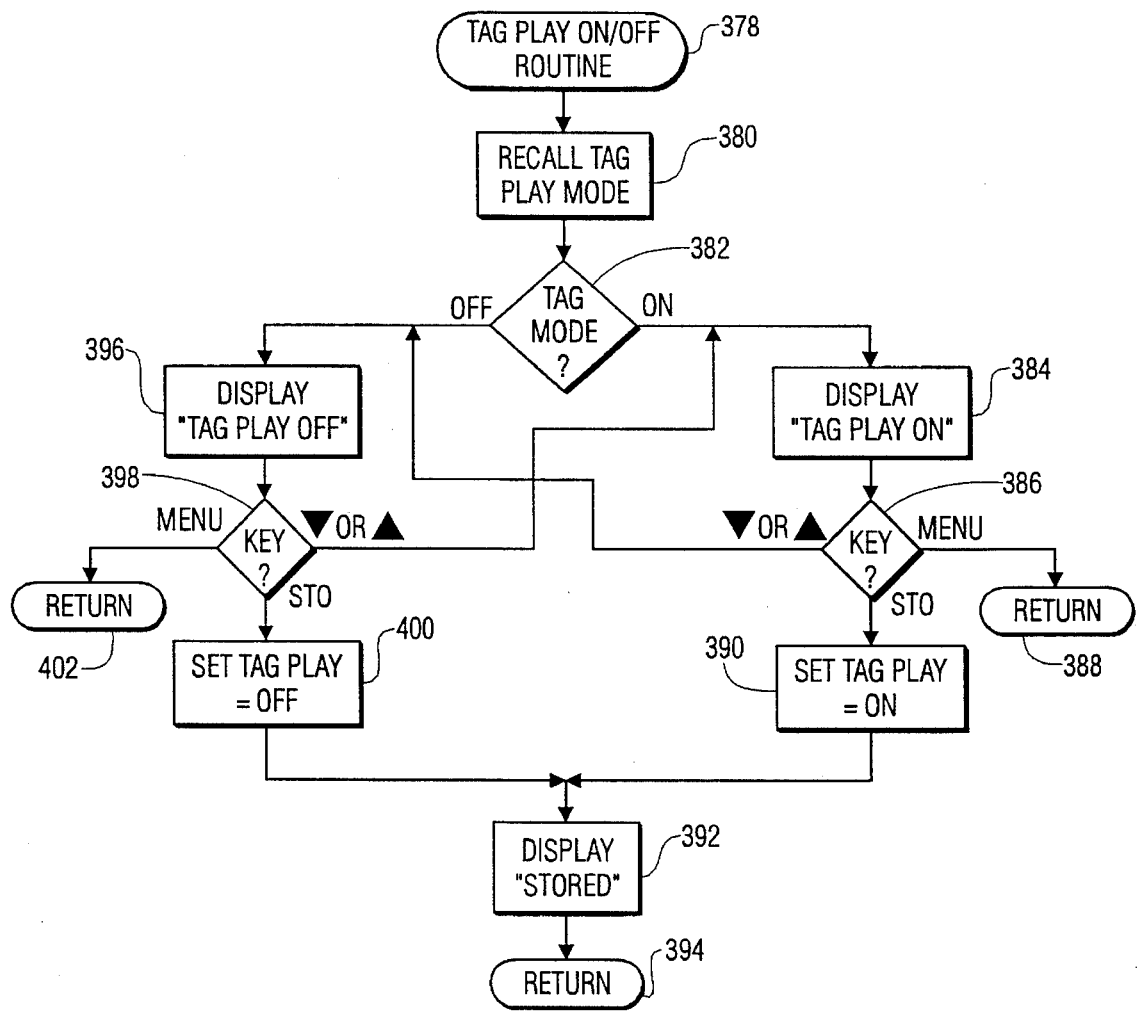

Reference is directed to FIG. 12 which is the software flow diagram for the tag play on/off routine. This routine sets the portable telephone to either play an audio message linked with data storage locations, as the data storage locations are recalled or to not play the audio as the data is recalled. The routine is entered at step 378 from step 292 in FIG. 9. The controller first recalls the present state of the tag play mode at step 380. if, at step 382, the tag mode is presently off, the controller proceeds to step 396 and displays "TAG PLAY OFF", indicating the present state to the user. Next, the controller checks for a key press at step 398. If the "MENU" key is pressed, the routine is exited at step 402 and returns to the main standby loop. If the "STO" key is pressed at step 398, The controller sets the tag play mode equal to off at step 400 and proceeds to step 392 where "STORED" is displayed. Then, software control is returned to the main standby loop at step 394.

Returning to step 382, if the tag mode is presently on, the controller proceeds to step 384 and displays "TAG PLAY ON" and then to step 386 to check for a key press. Similar to step 398, at step 386, if "MENU" is pressed, control is returned to the main standby loop at step 388. Alternatively, if "STO" is pressed at step 386, the controller sets the tag play mode to on at step 390 and displays "STORED" at step 392. If at either of steps 398 or 386, either the "▲" or "▼" keys are pressed, the controller flows to steps 384 and 396 respectively to display "TAG PLAY ON" or "TAG PLAY OFF" respectively. In this manner, the user can toggle between the on and off conditions for the tag play mode, and then press "STO" when the desired condition is displayed.

Figure 13:
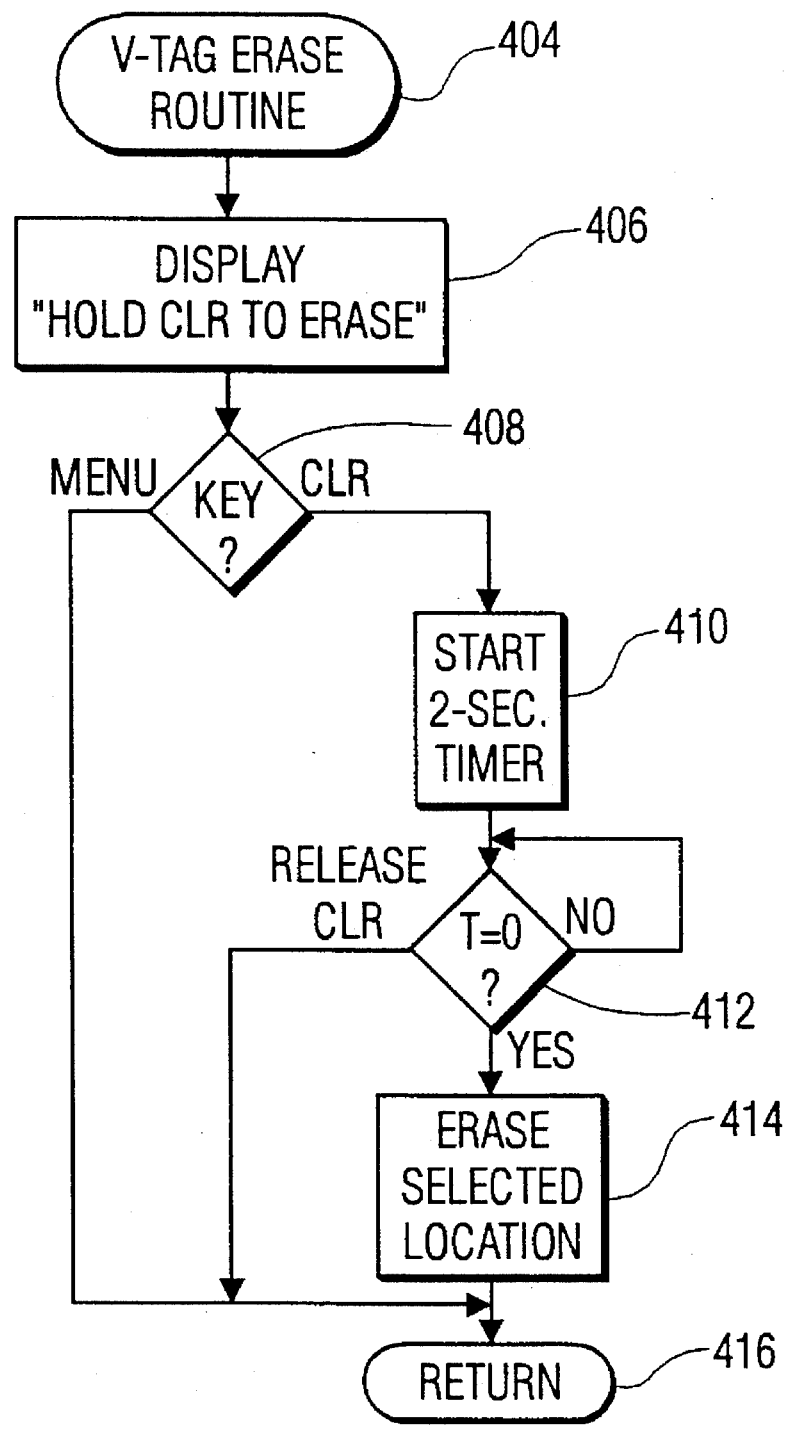

Reference is directed to FIG. 13 which is a software flow diagram of the voice tag erase routine in the preferred embodiment. The voice tag erase routine is entered at step 404 from step 298 in FIG. 9. This routine is used to erase a previously stored audio signal from an audio storage location linked to the presently selected one of the plurality of data storage locations. Upon entering this routine, the controller displays "HOLD CLR TO ERASE" at step 406 and then checks for the key press in step 408. If "MENU" is pressed, the control returns to the main standby loop at step 416. Alternatively, at step 408, if "CLR" is pressed, the controller starts a two second count down timer at step 410. The controller then proceeds in a count down loop at step 412 where the controller holds until the timer has counted down to zero. If the "CLR" key is released before the timer has reached zero, then the control is returned to the main standby loop at step 416. On the other hand, if the "CLR" key is held until the timer reached zero at step 412, the selected audio memory location is erased at step 414 and that location is made available for future recording. Also, the link established in the prior recording is broken upon erasing the audio storage location at step 414. Subsequently, the control of the software is returned to the main standby loop at step 416.

Figure 14:
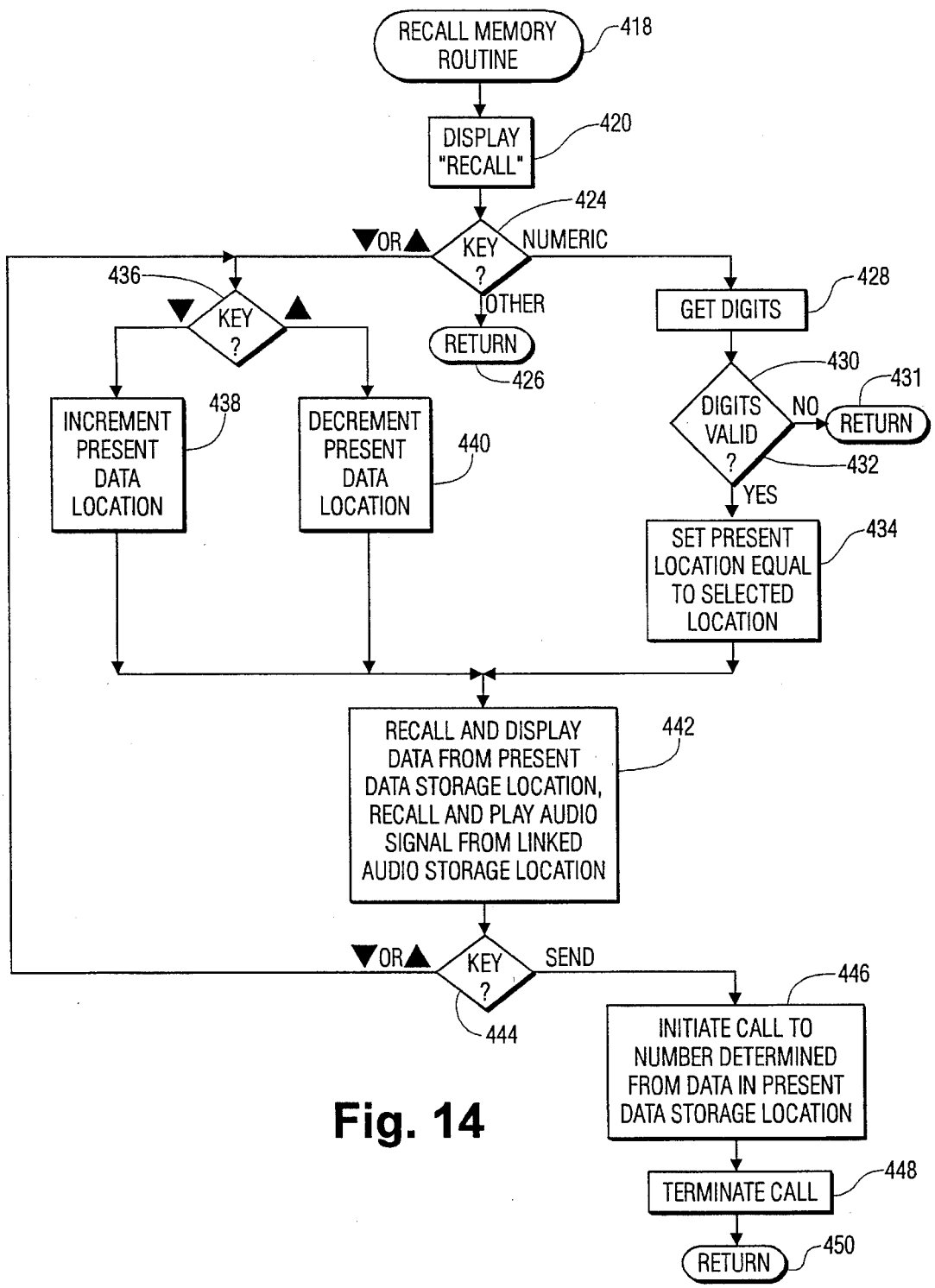

Reference is directed to FIG. 14 which is a software flow diagram of the recall memory routine. This routine is entered at step 418 from step 242 in FIG. 7. Upon entering the recall memory routine, the controller displays "RECALL" on the display at step 420, and then checks for a key press at step 424. The software allows for either scrolling through the data storage locations sequentially or direct selection of a location by entering the data storage location address. At step 424, if either the "▲" or "▼" key is pressed, the controller chooses a path according to which key is pressed, step 436. If the "▼" key was pressed, the controller increments a pointer from the presently selected data storage location to the next higher data storage location, at step 438. If, on the other hand, the "▲" key is pressed at step 436, the controller decrements the data storage location from the presently selected location to the next lower location at step 440. In either event, whether the data location pointer was incremented or decremented at step 438 or 440, the control goes to step 442 where the data is recalled from the selected data storage register and the audio tag in the audio storage location linked with the selected data storage location is played. If there is no linked audio storage location, then there is no tag played.

Next, at step 444, the controller checks for another key press. If either the "▲" or "▼" key is pressed, then the control returns to step 436 where the process of incrementing/decrementing, recalling, displaying, and playing is repeated. By virtue of this path, the user can scroll through the list of all data memory locations by pressing the "▲" or "▼" key and listening to any tagged messages that may have been recorded.

As an alternative to the scrolling described above, the user can merely selecte the desired data storage location at step 424. If the controller detects that a numeric digit was pressed at this step, the controller gets two digits at step 428 and checks if the digits are valid at step 430. If the data storage locations had address 01 through 99, then any pair of digits in that range could be valid, for example. If, at step 432, the digits are not in the valid range, then control of the software is returned to the main standby loop at step 431. If, on the other hand, the digits are in the valid range at step 430, then the controller sets the data storage location pointer to the selected location at step 434, thereby making the selected location the present location. Next the controller proceeds to step 442 an continues as described earlier.

At step 444, the controller checks for a key press. As described earlier, the "▲" or "▼" key recirculate the flow as described earlier. At step 244, if "SEND" is pressed, a telephone call is initiated to the number stored in the data storage location presently selected at step 446. Then, at step 448, the call is terminated in the conventional manner, well known in the art, and the control is returned to the main standby loop at step 450.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A telephone, comprising:

a data memory having a plurality of data storage locations for storing data, an audio memory having a plurality of audio storage locations for storing audio signals, said audio memory having an input for inputting the audio signals and an output for outputting the audio signals, and any of said plurality of audio storage locations can be linked to a presently selected one of said plurality of data storage locations, a speaker coupled to said output of said audio memory, a microphone coupled to said input of said audio memory, a controller coupled to said data memory and to said audio memory, a first actuator coupled to said controller for selecting said presently selected one of said plurality of data storage locations, a second actuator coupled to said controller for activating a record routine and a playback routine, wherein selecting said record routine causes said controller to cause said audio memory to store an audio signal input from said microphone into an available one of said plurality of audio storage locations and link said available one of said plurality of audio storage locations with said presently selected one of said plurality of data storage locations, and wherein selection of said playback routine causes said controller to cause said audio memory to recall and couple the audio signal stored in the one of said plurality of audio storage locations linked with said presently selected one of said plurality of data storage locations to said output of said audio memory, thereby playing the recalled audio signal through said speaker, and subsequent actuations of said second actuator cause said controller to sequentially select other ones of said plurality of data storage locations and sequentially play the corresponding linked audio signals.

2. The telephone in claim 1, further comprising:

a third actuator, coupled to said controller, for initiating a telephone call to a telephone number determined from the data stored in the presently selected one of said plurality of data storage locations.

3. The telephone of claim 2, further comprising:

a display, coupled to said controller, wherein said display displays the data stored in the presently selected one of said plurality of data storage locations.

4. The telephone in claim 2, wherein:

at least one of said first, second, and third actuators is an element in a key matrix.

5. The ] telephone in claim 1, wherein:

said speaker is a loudspeaker.

6. The telephone in claim 2, wherein:

said speaker is an ear speaker, and further comprising:

an amplifier having an input and an output, said input of said amplifier being coupled to said output of said audio memory, a speaker control circuit, coupled to said controller and further coupled to said amplifier for enabling and disabling said output of said amplifier, a loudspeaker, coupled to said output of said amplifier, and wherein actuation of said third actuator causes said speaker control circuit to disable said output of said amplifier.

7. The telephone in claim 2, further comprising:

a display, coupled to said controller, wherein said display is capable of displaying the data stored in the presently selected one of said plurality of data storage locations, and, wherein said display is capable of indicating said record mode and said playback mode in accordance with the presently selected condition of said second actuator.

\* \* \* \* \*